No. 695,544. Patented Mar. 18, 1902.
J. DEWES.
DIE.
(Application filed Apr. 27, 1901.)
(No Model.)
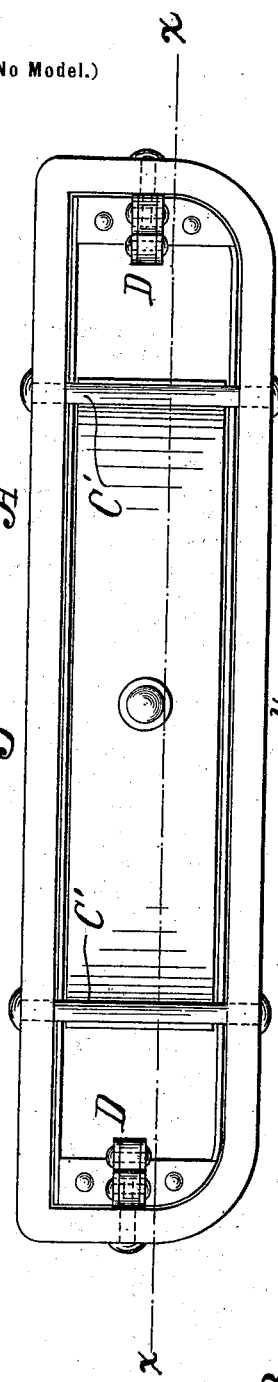
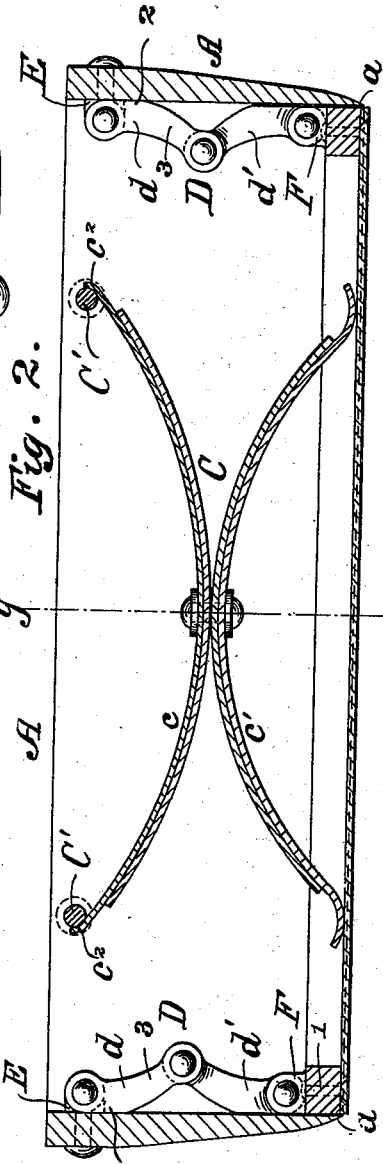
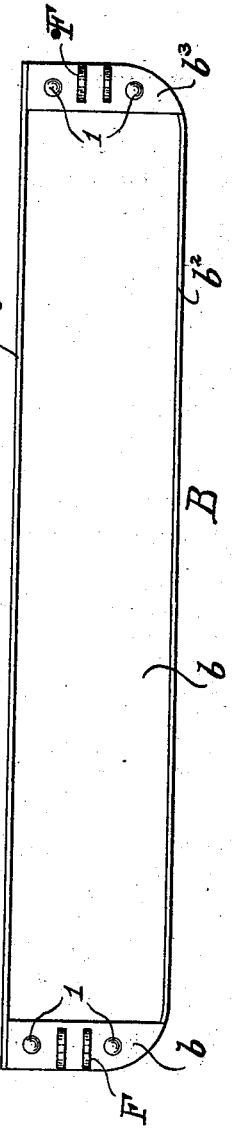
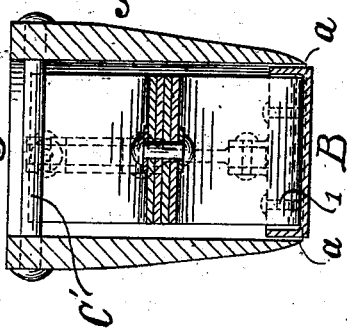
WITNESSES:
Frank J. Dewes
B. Paterson
INVENTOR
John Dewes
BY
ATTORNEYS

UNITED STATES PATENT OFFICE.

JOHN DEWES, OF NEW YORK, N. Y.

DIE.

SPECIFICATION forming part of Letters Patent No. 695,544, dated March 18, 1902.

Application filed April 27, 1901. Serial No. 57,657. (No model.)

*To all whom it may concern:*

Be it known that I, JOHN DEWES, a citizen of the United States, and a resident of New York, county of New York, and State of New York, have invented certain new and useful Improvements in Dies, of which the following is a specification, reference being had to the accompanying drawings, forming a part thereof, in which similar characters of reference indicate corresponding parts.

This invention relates to improvements in dies for simultaneously cutting a plurality of pieces of the same size and contour, as the several parts of a shirt—such as collars, cuffs, neckbands, &c.—the object thereof being to provide an efficient device of this character which is simple in construction, durable, and affective in general operation and which will cut through a maximum number of layers of material in such a manner as to produce pieces of uniform size.

A further object is to provide a device of this character having a plunger which will not warp, swell, or stretch, whereby a constantly smooth and even lower surface is maintained.

The invention will be hereinafter fully described, and specifically set forth in the annexed claim.

In the accompanying drawings, forming part of this specification, Figure 1 is a plan view of my improved die. Fig. 2 is a longitudinal sectional elevation taken on a line $x\ x$ of Fig. 1; Fig. 3, a vertical sectional elevation taken on the line $y\ y$ of Fig. 2, and Fig. 4 is a plan view of the plunger or follower employed in the construction of my improved device.

In the practice of my invention I employ, primarily, an endless cutting-die A, which is preferably composed of steel and which has its lower edge beveled to form the knife $a$. This die can be of any desired plan contour, and for purposes of illustration I have shown in the drawings a die of a shape adapted to cut wristbands for shirts.

Located within the cutter or die A is a plunger B, adapted for pressing the layers of material together while the die is cutting and for discharging the cut product. This plunger moves freely in a vertical direction within the cutter A, and it is maintained normally in an extended position, as shown by Figs. 2 and 3 of the drawings, by means of a suitable spring, as $c$, which comprises the two semi-elliptical parts $c$ and $c'$, the part $c$ having curved free ends $c^2$ which engage cross-bars C', whereby tension of the spring is maintained. The said plunger B is composed of any suitable metal, preferably sheet-steel, and it comprises the smooth bottom plate $b$, the longitudinal integrally-formed flanges $b'$ and $b^2$, and the end metallic block $b^3$, which blocks are held in place by means of the rivets 1. It will be noted that this plunger is of minimum thickness, whereby it has a maximum length of upward movement within the die to admit of cutting a large number of layers at one time, and owing to its rigidity and composition the bottom surface thereof always bears the same position relative with the knife edge, which insures evenness and uniformity of the cut product.

As a means for hanging the plunger B, I employ suitable folding hangers, preferably the hangers, as D, described and claimed in my application, Serial No. 28,122, filed August 27, 1900, and which respectively embody the upper and lower links $d$ and $d'$, which are composed of non-resilient metal. The upper links each embody a vertical part 2 and a downwardly and inwardly extended part 3, and the lower links are pivotally attached to the lower ends of the upper links. The hangers are pivotally attached at their upper ends to the lugs E, which are extended inwardly from the end walls of the die A, and the lower ends of the hangers are pivoted to lugs F, extended upwardly from the blocks $b^3$ of the plunger B. It will be noted that each hanger bows toward the center of the die, which permits of readily and automatically folding the hangers by the upward movement of the plunger B. The vertical parts 2 of each upper link $d$ form shoulders which abut against the walls of the die to limit the downward motion of the plunger, and the rigidity of the two parts of the hanger causes the plunger to be maintained constantly in one normal position and prevents an uneven vertical movement thereof. In the drawings the hangers each embody two upper links and one lower link; but I may employ any suitable number of links in the construction of each hanger or any number of hangers.

I do not confine myself to the contour of the die, nor to the specific shape of the links comprising the hangers, as it is obvious that other link connections may be employed.

In the operation and use of the device a pile or plurality of fabric sheets is placed beneath the die. A hydraulic or other press is then applied over the die, and pressure is exerted until the die moves downwardly and cuts through the pile carrying the product within the die. Then, pressure being released, the spring C moves the plunger B back to its normal position and discharges the cut product, and owing to the construction of my improved plunger and the hangers therefor the movement is perfectly vertical and true, and swelling, warping, or sticking common to the ordinary wooden plunger is obviated.

Having thus described my invention, what I claim as new, and desire to secure by Letters Patent, is—

The combination, with a cutting-die which embodies an endless knife, of a plunger comprising a sheet-metal bottom plate, integrally-formed longitudinal flanges and end blocks, and springs for moving the plunger, and hangers for limiting the outward movement of the plunger, each hanger embodying a lower-link portion and an upper-link portion hinged together, the part of each upper link having a bearing-surface to abut against the wall of the die, and means connecting the hangers, substantially as shown and described.

In testimony that I claim the foregoing as my invention I have signed my name, in presence of two witnesses, this 16th day of April, 1901.

JOHN DEWES.

Witnesses:
GEORGE A. GUMBS,
JOHN DEWES, Jr.